(12) United States Patent  
Augst et al.

(10) Patent No.: US 11,787,216 B2  
(45) Date of Patent: Oct. 17, 2023

(54) METHOD FOR PRODUCING A RELIEF-LIKE PRINTED IMAGE ON CONTAINERS

(71) Applicant: Krones AG, Neutraubling (DE)

(72) Inventors: Peggy Augst, Wackersdorf (DE); Alexandra Lyashenko, Regensburg (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 17/587,838

(22) Filed: Jan. 28, 2022

(65) Prior Publication Data

US 2022/0379647 A1 Dec. 1, 2022

(30) Foreign Application Priority Data

May 28, 2021 (DE) .......................... 102021113824.8

(51) Int. Cl.
*B41J 3/407* (2006.01)
*B41M 7/00* (2006.01)

(52) U.S. Cl.
CPC ........ *B41M 7/0018* (2013.01); *B41J 3/40733* (2020.08)

(58) Field of Classification Search
CPC ....... B41J 3/407; B41J 3/4073; B41J 3/40733
See application file for complete search history.

(56) References Cited

U.S. PATENT DOCUMENTS

| | | | |
|---|---|---|---|
| 6,135,654 A | 10/2000 | Jennel | |
| 10,752,538 B1 | 8/2020 | Chisholm et al. | |
| 2010/0221504 A1* | 9/2010 | Bauer | B29C 64/112 |
| | | | 347/101 |
| 2016/0221359 A1* | 8/2016 | Till | B65D 1/165 |
| 2016/0335781 A1* | 11/2016 | Sano | G06T 7/40 |
| 2017/0348981 A1* | 12/2017 | Preckel | B41J 2/01 |
| 2019/0152843 A1 | 5/2019 | Vandecruys et al. | |
| 2020/0189292 A1* | 6/2020 | Sonnauer | B41J 2/1707 |
| 2020/0346971 A1* | 11/2020 | Chisholm | B29C 64/112 |

FOREIGN PATENT DOCUMENTS

| | | |
|---|---|---|
| DE | 10 2007 022 919 A1 | 11/2008 |
| EP | 2 873 535 A1 | 11/2013 |
| WO | 2015 036 588 A1 | 3/2015 |
| WO | 2018 209 025 A1 | 11/2018 |

OTHER PUBLICATIONS

European Search Report for Application No. 22166581.3 dated Oct. 25, 2022, 10 pages.
German Search Report for Application No. 10 2021 113 824.8 dated Dec. 10, 2021, 5 pages.

* cited by examiner

*Primary Examiner* — Scott A Richmond
(74) *Attorney, Agent, or Firm* — Lowenstein Sandler LLP

(57) ABSTRACT

A method for producing a relief-like printed image on containers is described in which print layers are layered onto one another by way of jet application of a printing paint, an ink, a varnish, or an adhesive from at least one print head onto a container, thereby producing elevated regions of the printed image. Due to the fact that the print layers are each applied in full tone printing, optical and haptic effects can be created on container surfaces with low equipment complexity and a minimal number of printing steps.

19 Claims, 1 Drawing Sheet

METHOD FOR PRODUCING A RELIEF-LIKE PRINTED IMAGE ON CONTAINERS

RELATED APPLICATIONS

This application claims the benefit under 35 U.S.C. § 119(a) of German Application No. DE102021113824.8 filed May 28, 2021, the entire contents which are hereby incorporated by reference.

TECHNICAL FIELD

Embodiments of the present disclosure relate to a method for producing a relief-like printed image on containers and a container that is printed on in this manner.

BACKGROUND

A generic method is known from U.S. Pat. No. 10,752,538 B1 and WO 2018/209025 A1. According thereto, relief-like prints can be produced in inkjet printing processes using paints, inks, or varnish that cure by UV irradiation/LED irradiation. In this respect, U.S. Pat. No. 10,752,538 B1 describes that elevated structures having different thicknesses can be printed by way of greyscale printing/half tone printing.

Though, on the one hand, this printing method can be used flexibly to design a wide variety of 3-dimensional structures, on the other hand however, it requires relatively complex print templates and control algorithms. In addition, only certain inks can be used and consequently a relatively large number of printing steps are required to build up a sufficient total layer thickness.

There is therefore a need for alternative methods for producing relief structures on planar two-dimensional substrates such as labels, or on curved three-dimensional substrates such as cans, bottles, cups, or tubes, possibly also on wall regions of such containers with a relief-like surface.

SUMMARY

A method of this disclosure is used to produce a relief-like printed image on containers, such as bottles, cans, cups, or tubes. According thereto, print layers are layered onto each other by successively applying a paint, an ink, a varnish, or an adhesive from at least one print head onto a container in layers by way of jet application, i.e. according to the principle of the inkjet printing process. This creates elevated regions of the relief-like printed image. According to some embodiments of the present disclosure, the print layers are each applied in full tone printing.

Full tone printing enables a particularly efficient layer application with a large number of different paints, inks, varnishes, and/or adhesives. In other words, the number of individual printing steps for building up the relief-like printed image can be minimized as a result.

The same droplet size for jet application may be specified/set for at least two of the print layers, in particular for all print layers. This simplifies print control and enables a uniform specification of the largest possible droplet and/or the largest droplet.

The printed image may be produced in a first print region with a first layer build-up in which at least two of the print layers, in particular all print layers, have a congruent contour in the printed image. This allows for the creation of relief structures that are particularly distinctive, both visually and haptically.

The printed image may be produced in a second print region with a second layer build-up, in which the contour in the printed image, in particular of all print layers disposed on top of one another, becomes successively smaller in a step-like manner. This means that the print layers lying on top of each other in the top view of the printed image become increasingly smaller towards the top. This allows the optical and haptic effects of the relief structures produced to be adapted, for example, to a substrate with a base printed image and/or a substrate with a structured and/or relief-like surface.

The print layers are then applied one after the other in such a way that the spacings between their contour boundaries are each 1 to 20 mm or each 1 to 50 pixels. The larger value range is particularly suitable for decorative planar reliefs, the smaller value range particularly for fonts, symbols, lines, or similar components of the printed image, as well as for overlapping interlocked printed image regions, so-called stitching regions.

At least one of the print layers may be built up successively from several identical individual layers. As a result, particularly fine height gradations can be produced and/or paints, inks, adhesives, or varnishes can be processed that only allow for a relatively thin layer application in each printing step.

Print layers may be produced by way of a binary print head and/or by way of a half tone print head set to full tone printing. Firstly, this reduces the equipment complexity required, but, secondly, the method can also be used on printing machines that are also designed for half tone printing.

Each print layer may be created using at least one separately assigned print head. This variant is particularly suitable for printing from stationary print heads in the periphery of a container carousel or similar transport devices for transporting the containers.

It is also conceivable to print onto the containers in printing modules in which print heads are distributed around the circumference of the respective container. The respective container is then, for example, guided by a gripper to the center of the printing module and is rotated there with respect to the print heads, so that it is printed on in multiple colors. Such printing modules/printing stations can be arranged to travel along at the outer circumference of a carousel or to be stationary. A linear series of such printing stations is also conceivable.

The print layers may be cured by way of UV light, in particular from at least one LED. This enables a rapid sequence of printing steps for the individual print layers, for example, for intermediate curing of one or more print layers, as well as final curing of the relief-like printed image which is suitable for further processing of the containers.

In some embodiments, the printed image could be applied using other inks, i.e. using those that do not cure by UV irradiation, as well as by way of other printing methods.

The print layers may be applied to a substantially smooth base printed image present on the container, for example, a multi-color print, for example, in a single-pass or multi-pass color application. This is to be understood to mean a substrate without its own relief-like contouring. However, the substrate can then still have a structured surface, for example, in the sense of matting or embossing. This enables optical and/or haptic support/emphasis on the base printed image due to the elevated layer build-up.

The print layers may create a color contrast and/or thickness contrast (for example multi-layer black print) to the base printed image. In addition to haptic effects, a large number of optical effects are also made possible.

The print layers may be applied to a surface structure formed in a relief-like manner on the container. As a result, their perception can be enhanced optically, for example, through color contrast, and/or haptically in a flexibly adaptable manner.

The elevated regions may be produced by overlaying the print layers to a total layer thickness of 50 µm to 5 mm. The maximum layer thickness is substantially limited by the maximum printing distance that can be set, i.e. by the design of the respective print unit. Such layer thicknesses are particularly suitable for desired optical and haptic effects on commercial product packaging.

The relief-like printed image may be applied by way of at least one print head during the continuous transport of the container.

The container according to some embodiments of the present disclosure is, for example, a bottle, a can, a cup, or a tube, each for receiving liquid or pasty end products such as food, and comprises a relief-like printed image applied using a method according to at least one of the embodiments described.

BRIEF DESCRIPTION OF THE DRAWINGS

Some embodiments of the present disclosure are shown by way of the drawings.

DETAILED DESCRIPTION

Figure 1:
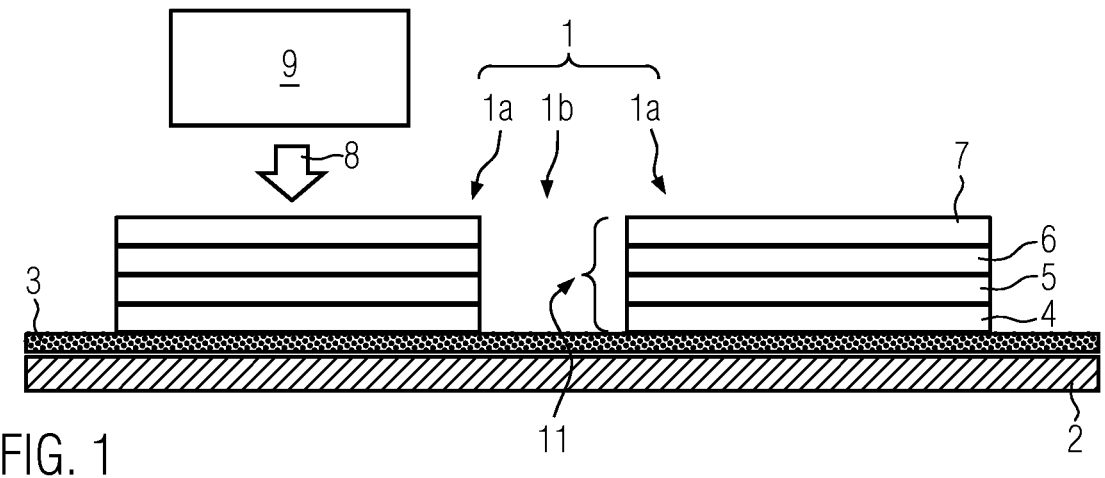
FIG. 1 is a layer structure according to a first embodiment.

As can be seen in FIG. 1, a relief-like printed image 1 is produced on a container 2 which is, for example, a bottle, a can, a cup, or a tube. Only the substrate to be printed on is shown as a representation of container 2. This can be the surface of a planar or curved wall section of container 2 as well as a base print 3 previously applied thereto, as shown by way of example.

Relief-like printed image 1 comprises at least two print layers 4-7 which are layered onto one another by successive jet application of a printing paint 8, an ink, a varnish or an adhesive according to the principle of an inkjet printing method from at least one (only schematically indicated) print head 9. Hereinafter, only one printing ink 8 shall be spoken of, representative of the above materials.

This produces elevated regions 1a of relief-like printed image 1, in contrast to regions 1b of relief-like printed image 1 that are not printed in a relief-like manner, at which only the substrate, i.e., for example, base print 3, then appears optically and/or haptically.

In some embodiments, print layers 4-7 are each applied in full tone printing. For the sake of simplicity, this is also referred to as black and white printing, where any other color can be printed instead of black. The color white designates the unprinted background (derived from white paper background) and therefore the regions of printed image 1 that are omitted in the respective printing step and not provided with a print layer 4-7. In contrast to half tone printing, full tone/black and white printing does not have any grey scale value.

Relief-like printed image 1 can be located in an overlapping interlocked printed image region, a so-called stitching region. The associated electronic print template can be created using the algorithms that are customary for such interlockings with a different stitching region.

In FIG. 1, a print head 9 for producing one of print layers 4-7 of relief-like printed image 1 is indicated schematically by way of example. Print head 9 can be a binary print head solely for full tone printing or a print head for half tone printing, which is basically designed for the creation/printing of gray scales.

Due to its design, binary print head 9 prints throughout, i.e. over the entire printing period, with a uniform droplet size. This can be viewed as an alternative definition for full tone printing/black and white printing for the principle of inkjet printing.

Print heads 9 for half tone printing, i.e. those that could print gray scales, are operated in the inkjet printing method described with a droplet size that is set uniformly for the entire printed image (unchanged in terms of location and time), for example, with the maximum droplet size.

The droplet size of printing ink 8 can be specified in a manner known in principle by the print data (print template) or by independent control of the respective print head 9, for example, by a voltage signal (waveform) responsible for this. The gray scale function of such print heads 9 is therefore deliberately eliminated. They are thus restricted to full tone print/black and white print.

In principle, such a procedure would also be conceivable for other printing methods for containers, for example, for screen printing using UV-curing inks or other industrially printable materials. In analogy to the uniform droplet size, a uniform screen size could be used in screen printing.

One and the same printing ink 8 may be used for individual print layers 4-7. However, different printing inks 8 would basically also be conceivable.

Layer build-up 11-13 of relief-like printed image 1 is possible in different ways as follows.

FIG. 1 shows layer build-up 11 in a first variant. According thereto, at least two, in particular at least three, print layers 4-7 can be printed one on top of the other with the same contour and position in the printed image, i.e. with identical surface dimensions and congruently. A larger number of print layers 4-7 arranged in this manner is generally possible.

The properties of printing ink 8, such as its viscosity and/or temperature, the properties of the substrate, such as its surface property, and the dimensions of elevated regions 1a, i.e. their surface content and relative height, can be taken into account in a method of an embodiment of the present disclosure.

Figure 2:
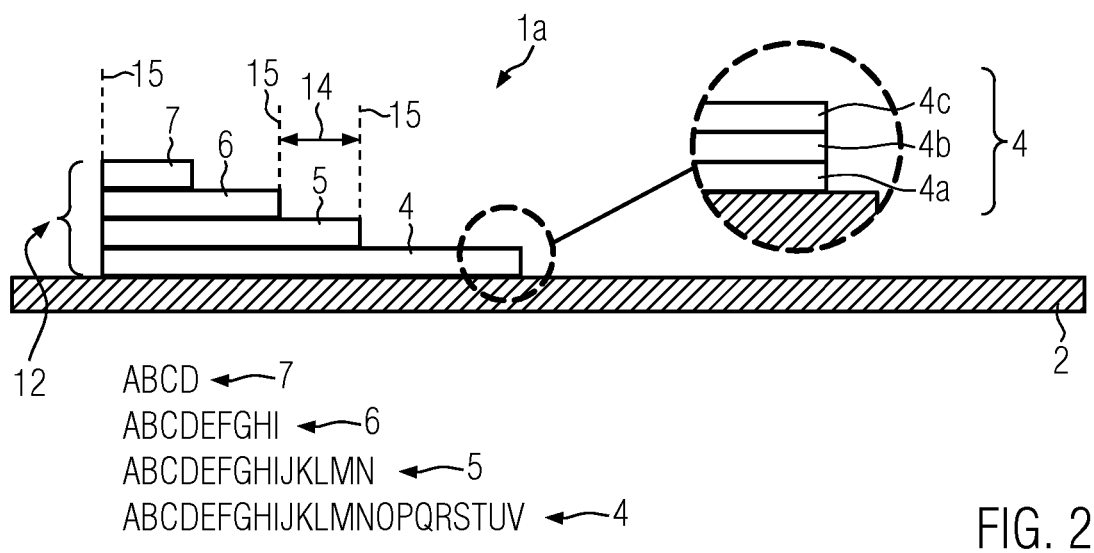
FIG. 2 is a layer structure according to a second embodiment.
Figure 3:
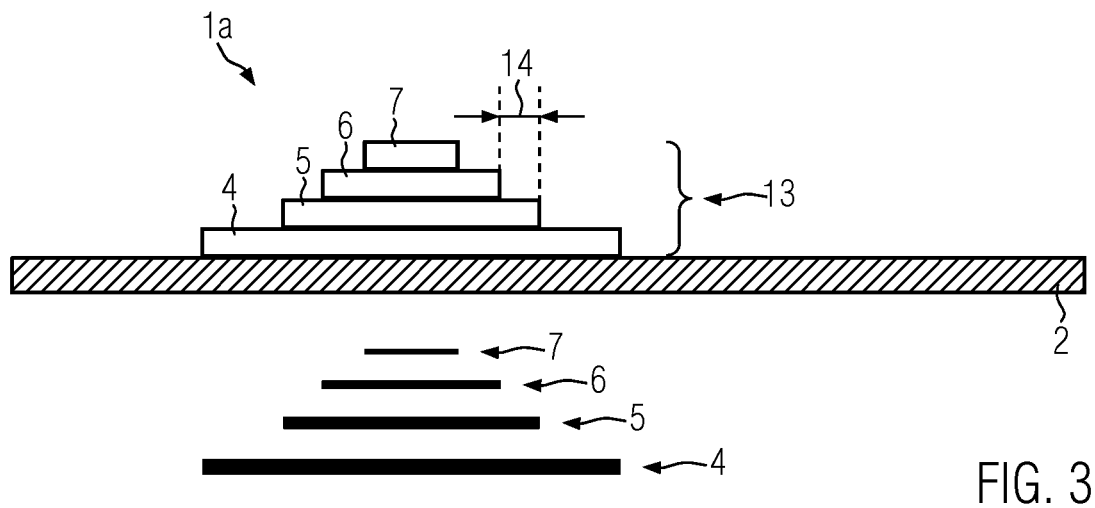
FIG. 3 is a layer structure according to a third embodiment.

FIGS. 2 and 3 show schematically layer build-up 12, 13 according to a second and a third variant. According thereto, print layers 4-7 can be layered on top of one another having contours/area dimensions that become smaller in steps starting from the base of elevated region 1a and moving upwards.

Step widths 14 between respective adjacent contour boundaries 15 of print layers 4-7 of, for example, several millimeters or centimeters are possible in order to visually and/or haptically differentiate decorative elements or writing fields from one another. Such writing fields of different sizes for individual print layers 4-7 are indicated by way of example in the lower region of FIG. 2 in a simplified top view.

Smaller step widths 14, for example, in the range of 1-50 pixels (printed image points) are suitable for optically and/or haptically emphasizing lines, symbols, and characters. Lines of different widths used for this purpose in the sense of an optionally stepped bold print are indicated by way of example in the lower region of FIG. 3 for individual print layers 4-7 in a simplified top view.

In addition, the inks usually run after application. With the step-wise application with layer dimensions that become smaller towards the top, see above, the individual elements of the printed image can be kept as fine as possible and, for example, easily legible. Undesirable bold print and/or letters or similar elements of the printed image merging can then be avoided.

FIG. 2 also shows schematically that individual or all print layers 4-7 can be built up from at least two identical individual layers 4a-4c. In this case, both print layers 4-7 as well as individual layers 4a-4c are each printed with a uniform droplet size.

In principle, any combination of print layers 4-7 and these individual layers 4a-4c, which may also be built up differently, are conceivable. Basically, such combinations are only limited in terms of the device, for example, if each print layer 4-7 or individual layer 4a-4c is assigned a separate print head 9.

Any combinations of first to third layer build-up 11-13 are also possible, for example, partially congruent contour boundaries 15 (FIG. 2, on the right) and partially stepped contour boundaries 15 (FIG. 2, on the left).

Relief-like printed image 1 can be printed directly onto the respective substrate (container wall) with or without pre-coating/pre-treatment, as well as onto a base print 3 previously printed there. In principle, a layer build-up 11-13 with print layers 4-7 in one or more colors is possible there. With relief-like printed image 1, particularly interesting optical effects and designs can be created on colored base prints 3. In the case of pre-treatment, for example, a thin silane layer could optionally be applied.

The position and contour of elevated regions 1a in relief-like printed image 1, i.e. the locations on the substrate provided for the full tone application of color, are specified with the aid of a computer by the print data and the substrate data. Print data for stepped contours/area dimensions of individual print layers 4-7 can either be adapted in an automated manner or by manual input using image processing programs.

White, black, chromatic colors (typically CMYK and special user-specific colors, for example, according to the Pantone scale), transparent varnish, and/or functional (for example conductive, magnetic, fluorescent or phosphorescent) inks can be used as printing inks 8.

The inks may be UV-curing printing inks 8.

Typical printing speeds are, for example, 100 to 1200 mm/s.

Print layers 4-7 can be cured intermediately, although this is not typically necessary after each individual layer application. Intermediate curing after every second or third printing step (print layer 4-7) has proven to be successful with UV-curing printing inks 8.

The number and type of curing steps depend on printing ink 8 respectively used and can be adapted thereto in a manner that is known in principle.

A method described according to some embodiments of the present disclosure can be used, for example, as follows:

Containers 2 to be printed on may be transported on a container carousel or other transport device through the working region of stationary print heads 9. The containers are thus positioned in a manner known in principle for direct-to-shape printing or a digital inkjet printing method for three-dimensional objects, also referred to as direct printing when used on containers.

Printing ink 8 is ejected at each of print heads 9 on the basis of an electronic print template such that a respective print layer 4-7 is produced in full tone printing in the wall regions of containers 2 intended for the creation of elevated regions 1a. Individual print layers 4-7 are layered onto one another in accordance with at least one of layer build-up 11-13 described above during the continuous onward transport of containers 2.

If necessary, individual or groups of print layers 4-7 are intermediately cured by way of UV irradiation and finally cured after layers 11-13 have been completely built up to form elevated region 1a.

Full tone printing is implemented on the device side either by using print heads 9 designed exclusively for this purpose or by appropriate control-induced restrictions of print heads 9 designed for half tone printing.

A method, according to some embodiments of the present disclosure, has been described above for digital ink jet printing (direct printing) of relief-like printed image 1 onto a container 2. However, it is also conceivable to produce relief-like printed image 1 in the variants described on planar substrates, for example, on labels, flat glass, films, or sheets of metal, which can be, for example, components of cans (neither shown). For example, labels printed onto in this manner are then applied to containers 2 in a manner that is known in principle.

It is to be understood that the above description is intended to be illustrative, and not restrictive. Other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method for producing a relief-like printed image on containers, comprising:
    printing a plurality of print layers onto a print region of a container using an inkjet printer;
    wherein the plurality of print layers are each applied by full tone printing by way of one or more of a binary print head of the inkjet printer, having no grey scale function, or a half tone print head of the inkjet printer, set to full tone printing by eliminating a grey scale function of the half tone print head;
    wherein the plurality of print layers are layered onto one another by way of jet application of a printing paint, an ink, a varnish, or an adhesive from at least one print head of the inkjet printer onto the print region of the container; and
    wherein the plurality of print layers produce elevated regions of said relief-like printed image.

2. The method of claim 1, wherein a same droplet size is specified for at least two print layers of said plurality of print layers.

3. The method of claim 1, wherein said relief-like printed image is produced with a first layer build-up in which at least two print layers of said plurality of print layers have a congruent contour.

4. The method of claim 3, wherein said relief-like printed image is produced with a second layer build-up in which a contour of said plurality of print layers disposed on top of one another becomes successively smaller in a step-like manner.

5. The method of claim 4, wherein said plurality of print layers are applied one after the other in such a way that a spacing between one or more contour boundaries are each 1 to 20 mm.

6. The method of claim 4, wherein said plurality of print layers are applied one after the other in such a way that a spacing between one or more contour boundaries are each 1 to 50 pixels.

7. The method of claim 1, wherein at least one of said plurality of print layers is built up successively from several identical individual layers.

8. The method of claim 1, wherein each of the plurality of print layers is produced with at least one separately assigned print head of the inkjet printer.

9. The method of claim 1, wherein said plurality of print layers are cured by way of ultra-violet (UV) light from at least one light emitting diode (LED).

10. The method of claim 1, wherein said plurality of print layers are applied to a planar base print present on said container.

11. The method of claim 10, wherein said plurality of print layers create one or more of a color contrast or a thickness contrast to said planar base print.

12. The method of claim 1, wherein said plurality of print layers are applied to a surface structure designed in a relief-like manner on said container.

13. The method of claim 1, wherein said elevated regions are produced by overlaying said plurality of print layers to a total layer thickness of 50 µm to 5 mm.

14. The method of claim 1, wherein said relief-like printed image is applied by way of at least one print head of the inkjet printer during a continuous transport of said container.

15. The method of claim 1, wherein a same droplet size is specified for all print layers of the plurality of print layers.

16. The method of claim 1, wherein said printed image is produced with a first layer build-up in which all print layers of said plurality of print layers have a congruent contour.

17. The method of claim 1, wherein said elevated regions are produced by overlaying said plurality of print layers to a total layer thickness of 0.1 to 2 mm.

18. The method of claim 1, wherein said printed image is produced with a first layer build-up in which all of said plurality of print layers have a congruent contour.

19. A container for receiving liquid end products, the container comprising a relief-like printed image that was applied using a method comprising:

printing a plurality of print layers onto a print region of the container using an inkjet printer, wherein the plurality of print layers each having been applied by full tone printing by way of one or more of a binary print heat of the inkjet printer, having no grey scale function, or a half tone print head of the inkjet printer, set to full tone printing by eliminating a grey scale function of the half tone print head;

the plurality of print layers having been layered onto one another by way of jet application of a printing paint, an ink, a varnish, or an adhesive from at least one print head of the inkjet printer onto the print region of the container;

wherein the plurality of print layers produce elevated regions of said relief-like printed image.

* * * * *